United States Patent [19]
Stufflebeam et al.

[11] Patent Number: 4,878,262
[45] Date of Patent: Nov. 7, 1989

[54] AUTOMOTIVE SCRUBBER

[75] Inventors: Frank L. Stufflebeam, Grimes; James A. Nelson, Des Moines, both of Iowa

[73] Assignee: Ryko Manufacturing Company, Grimes, Iowa

[21] Appl. No.: 162,168

[22] Filed: Feb. 29, 1988

[51] Int. Cl.[4] ............................................. B60S 3/06
[52] U.S. Cl. .............................. 15/53 B; 15/DIG. 2
[58] Field of Search ............... 15/53 A, 53 AB, 53 B, 15/DIG. 2, 97 B

[56] References Cited

U.S. PATENT DOCUMENTS

| | | | |
|---|---|---|---|
| 3,662,417 | 5/1972 | Fuhring et al. | 15/53 B |
| 3,772,724 | 11/1973 | Wilson | 15/53 AB |
| 3,931,660 | 1/1976 | Capra | 15/53 AB |
| 4,192,037 | 3/1980 | Capra | 15/53 B |
| 4,550,464 | 11/1985 | Messing | 15/53 B |
| 4,754,515 | 7/1988 | Ennis et al. | 15/53 AB |
| 4,769,868 | 9/1988 | Pagnanelli et al. | 15/53 AB |

FOREIGN PATENT DOCUMENTS

| | | | |
|---|---|---|---|
| 3231035 | 2/1984 | Fed. Rep. of Germany | 15/53 B |
| 0058538 | 4/1982 | Japan | 15/53 AB |

*Primary Examiner*—Edward L. Roberts
*Attorney, Agent, or Firm*—Allegretti & Witcoff, Ltd.

[57] ABSTRACT

A scrubber for an automotive vehicle. The scrubber includes a brush, pivot and centering assembly. The brush scrubs the vehicle. The pivot allows the brush to change angular orientation. The centering means urges the brush toward a single predetermined angular orientation. In this way, should a vehicle drive into the brush, the brush may pivot with the force applied to it, reducing the chance that the brush or the vehicle will be damaged. The centering mechanism, however, urges the brush toward a predetermined angular orientation so that, absent an external force applied to the brush, the brush will be in a predetermined position ready for scrubbing the vehicle.

14 Claims, 5 Drawing Sheets

AUTOMOTIVE SCRUBBER

BACKGROUND OF THE INVENTION

The present invention relates generally to automotive washing apprratus and more particularly to a mechanical scrubber for cleaning the wheels of all types of automotive vechicles. A number of mechanical car wash apparatus are commercially available. Such apparatus include, by way of illustration only, "rollover", "drive through", "spray wash", "tunnel" or "conveyorized" systems.

One typical apparatus, below for purposes of illustration only, includes a gantry and a washing area for the vehicle underneath the gantry. The apparatus sprays water and soap on the vehicle, and brushes engage the sides and top of the vechicle to clean it. Such washing apparatus sometimes include scrubbers for the wheels and tires of the automotive vehicle. A moving brush is extended inward, from the inner wall of the gantry toward the vehicle, to engage the wheels of the vehicle and then retracted after the washing operation on the wheels is completed.

Unfortunately, many of the currently available wheel scrubbers are prone to being damaged. For example, a driver may drive out of the washing area before the brushes have retracted. Alternatively, the mechanism for reacting the brushes may simply malfunction, failing to retract the bushes. Should such an event occur, the wider portions of the vehicle may contact the brushes, pushing the brushes out of their normal position, resulting in damage to both the scrubber and the vehicle.

In addition, a first vehicle may drive away from the washing apparatus before the wheel scrubbers have completed a timed sequence of washing. A second car then may enter the washing area while the wheel scrubbers are still extended. The second vehicle entering the washing area may then collide with the extended washers, again causing damage to both the wheel scrubber and the second vehicle. Moreover, should the mechanism for retracting the wheel scrubbers malfunction, a car entering the car wash area would, again, be prone to collide with the extended scrubbers, similarly causing damage to the scrubber and car.

The risk of such damage becomes particularly acute where the general public is allowed to drive cars through the car washing apparatus. Members of the general public, unfamiliar with the normal operation of the car wash equipment, may fail to realize when another vehicle has driven off prematurely or when the retracting mechanism for the wheel scrubbers has malfunctioned. Accordingly, should the wheel scrubbers malfunction and remain in the extended position, or should the driver of a first vehicle drive out of the car wash area prematurely, there is a substantial possibility that the driver of the next car will nonetheless drive into the car wash area and collide with the entended wheel scrubbers.

Occasionally, drivers may back their vehicles into the exit of a car wash, perhaps seeking for the apparatus to make "another pass" on their vehicle. Extended scrubbers are, of course, vulnerable to damage from such drivers backing up their vehicles.

SUMMARY OF THE INVENTION

In a principal aspect, the present invention is a scrubber for an automotive vehicle. The scrubber includes a brush, a pivot and a centering assembly. The brush wipes the vehicle. The pivot allows the brush to change its angular orientation. Thus, should a vehicle drive into the brush, the brush may move, changing its angular orientation and substantially avoiding damage to itself or the vehicle. The centering assembly, however, urges the brush back toward a normal, predetermined angular position. Accordingly, after the vehicle has passed by and the force against the brush is withdrawn, the centering mechanism urges the brush back to its normal position, ready to wash another vehicle.

According to another feature of the present invention, the scrubber includes both a frame and an extension for pushing the brush toward the vehicle. The extension interconnects the brush and the frame. When the vehicle is to be washed, the extension may move the brush toward the vehicle. In addition, the angular orientation of the brush is defined by the angular position of the extension with respect to the frame. Thus, should a vehicle drive into the brush, both the brush and the extension will change angular positions, moving in response to force applied by the vechile. The pivot urges both the brush and the extension back to a normal, predetermined position.

Accordingly, an object of the present invention is an improved scrubber for an automotive vehicle. Another object is a scrubber that is more effectively protected from damage by collision with an automotive vehicle. Still another object is a scrubber that is less likely to break down and is less expensive to manufacture than alternative safety systems. Yet another object, is a scrubber that is more reliable and easier to service. These and other objects of the present invention will be more fully understood by reference to the following detailed description of the preferred embodiment.

BRIEF DESCRIPTION OF THE DRAWING

A preferred embodiment of the present invention is described herein with reference to the drawing wherein.

DETAILED DESCRIPTION OF A PREFERRED EMBODIMENT

Figure 1:
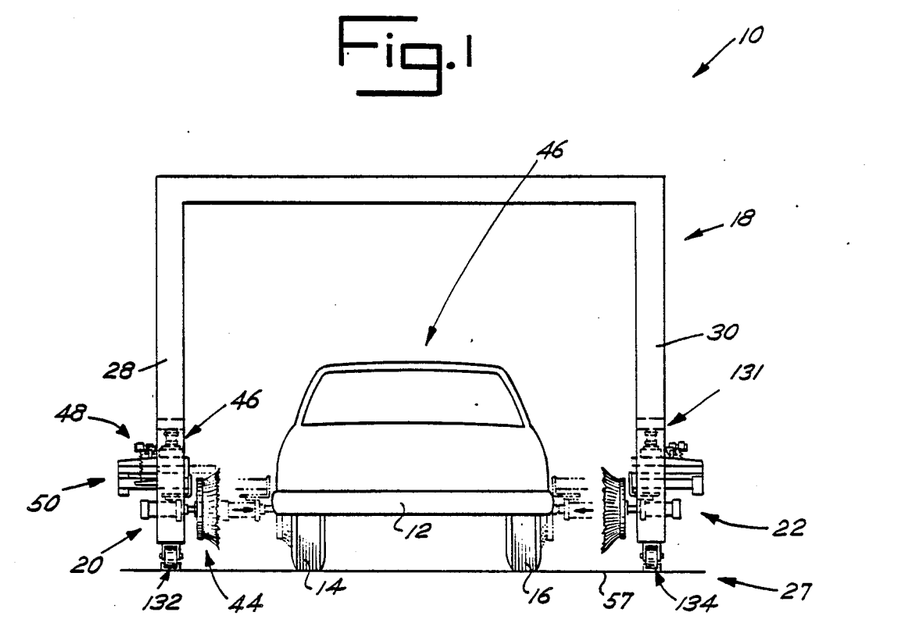
FIG. 1 is a front view of a preferred embodiment of the present invention, showing the rear entrance of the apparatus.
Figure 2:
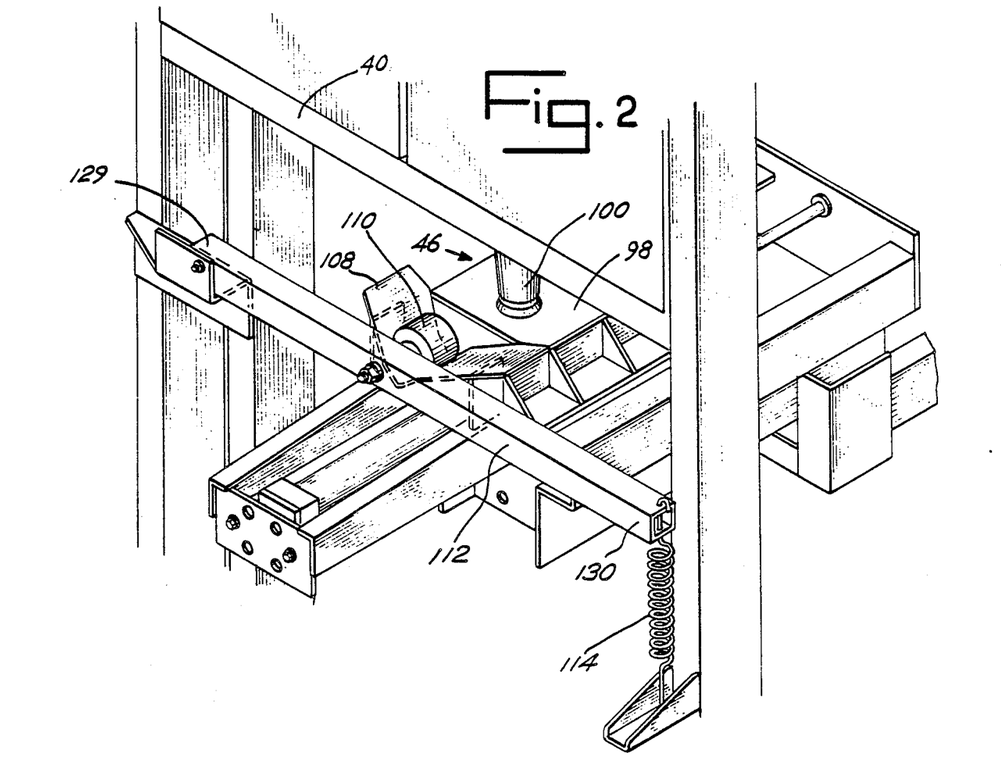
FIG. 2 is a perspective view of the pivot and centering assembly of the preferred embodiment shown in FIG. 1.
Figure 3:
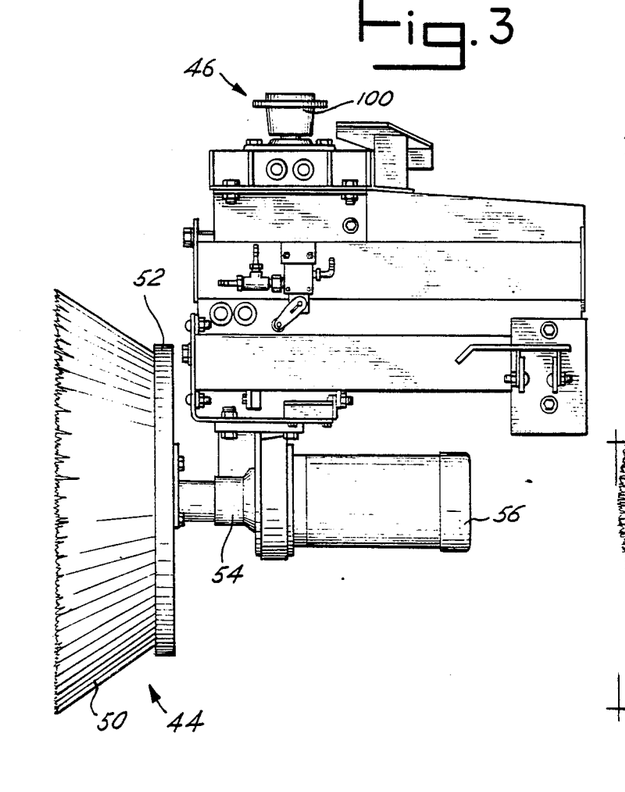
FIG. 3 is a side view of the brush and pivot of the preferred embodiment shown in FIG. 1.

Referring to FIGS. 1–13, a preferred embodiment of the present invention is shown as an improved scrubber, generally designated 10, for an automotive vehicle 12. The preferred embodiment shown FIG. 2 cleans the left and right wheels and tires (hereafter referred to simply as the "wheels") 14, 16 of the vehicle 12. The scrubber 10 includes a frame 18, and left and right wheel scrubbing apparatus 20, 22, and a sensor assembly 24. The scrubber 10 could, of course, include additional wheel scrubbing apparatus (not shown) so that the scrubber 10 could clean more than two wheels at once. It is to be understood, of course, that a particular preferred embodiment is described for purposes of illustration only. As set forth above, many other types of washing apparatus for a variety of vehicles are well known in the art.

The frame, or gantry 18, is made of aluminum and includes four vertical support members, 28, 30, 32, 34 a bracing members 36, and two side bracing members 40, 42. See FIGS. 1 and 8. Other components of the scrubber 10 are mounted on the frame 18. Other washing equipment, such as washing brushes and air drying apparatus, can, of course, be attached to the frame 18 to work in conjunction with the scrubber 10.

The vertical members 28, 32 and 30, 34 and bracing members 40, 42 define a car wash area 46 between them. The vehicle 12 may enter the car wash area 46 to be washed.

In the preferred embodiment, both the left and right wheel scrubbing apparatus 20,22 are substantially similar. Thus, for purposes of illustration, only the left wheel 20 scrubbing apparatus is described in detail in the following description. Of course, not all washing apparatus have identical left and right sections. A "track" vehicle wash may, for example, keep the left wheel of a vehicle at a substantially fixed position relative to the left side of the apparatus, regardless of the width of the vehicle being washed.

The wheel scrubbing apparatus 20 includes a brush 44, pivot 46, centering assembly 48, and extension assembly 50. The brush 44 includes bristles 51, a brush base 52, gear reducer 54 and an electric motor 56. The bristles 51 are attached to the base 52 and provide a cleaning surface approximately two feet in diameter. The electric motor 56 delivers approximately one horsepower and is connected to the 11 to 1 gear reducer 54 which, in turn, is connected to the base 52 of the brush 44. During operation, the base 52 turns at a speed of approximately 160 revolutions per minute. The motor 56, gear reducer 54 and brush 44 are positioned on the frame such that the center of the base of the brush rides approximately one foot above the ground 57.

The brush 44 is directly connected to the extension assembly 50. The extension assembly 50 includes first and second extension arms 58, 60. Each arm is connected to a source of compressed air (not shown), such as that commonly available in vehicle service stations and typically applied to other car washing apparatus.

The first arm 58 includes a first pneumatic cylinder 62, first and second side supports 63, 64, a front assembly 68, and a base assembly 70. The pneumatic cylinder 62 includes a rod 72, interconnected to the front assembly 68, and a base 74, interconnected to the base assembly 70 of the first arm 58. The base 70 of the first arm 58 is connected to the second arm 60 of the extension assembly 50. The first and second side supports 63, 64 define left and right slots 65, 66 for rollers.

The second extension arm 60 includes a second pneumatic cylinder 76, left and right side supports 78, 80, four lower rollers 82, 84, 86, 88, a front assembly 90 and a base assembly 92. The pneumatic cylinder 76 includes a rod 94 interconnected to the front assembly 68, and a base 96, interconnected to the base assembly 92 of the second arm 60. The four lower rollers 82–88 ride in the left and right slots 65, 66 formed by the first and second supports 63, 64 of the first arm 58.

Thus, when the first pneumatic cylinder 62 is extended to its full amount, air will then be supplied to the second pneumatic cylinder 76 so that it too will start pushing out the rod 94, causing the front assembly 90 of the second arm 60 to be pushed toward the vehicle 12. Since the first arm 58 is interconnected to the front assembly 90 of the second arm 60, both the brush 44 and the entire first arm 58 are also pushed toward the vehicle 12 when the second pneumatic cylinder 62 is actuated. The base assembly 92 of the second arm 60 is connected to the pivot 46.

Figures 6, 8:
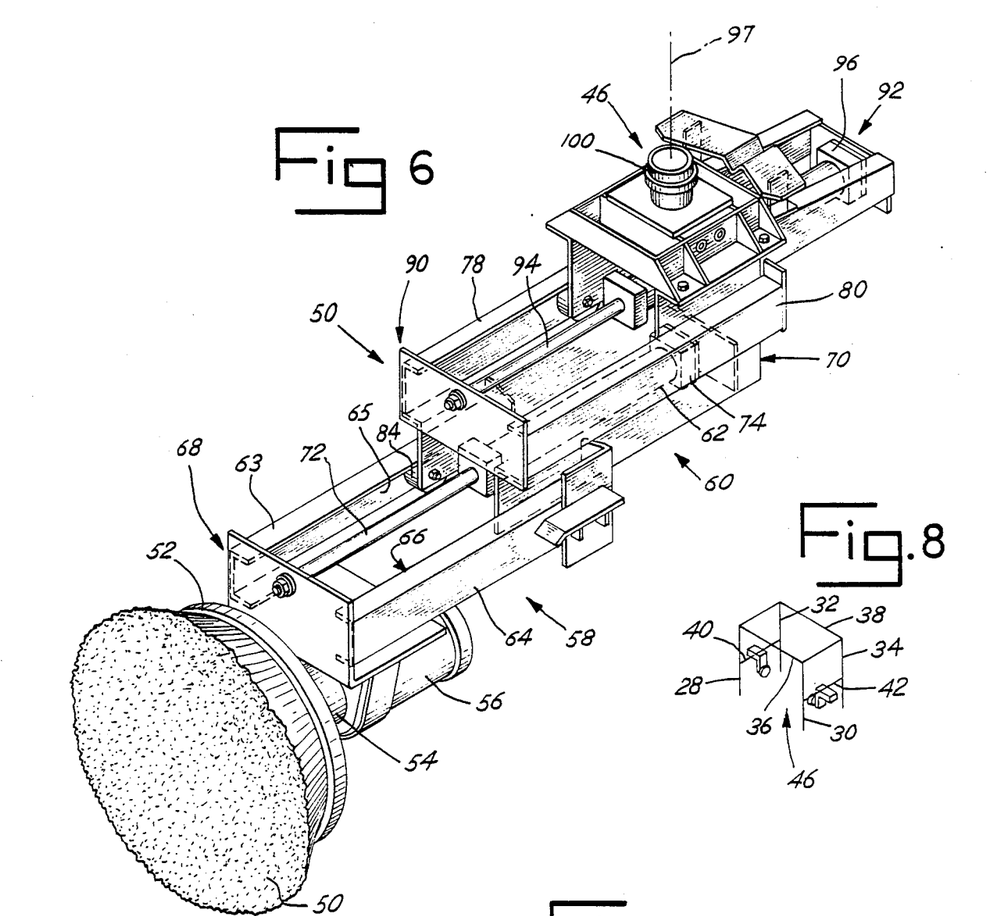
FIG. 6 is a perspective view of the brush, pivot and extension of the preferred embodiment shown in FIG. 1.
FIG. 8 is a perspective view of the preferred embodiment shown in FIG. 1.

The pivot 46 rotatably interconnects the base assembly 92 of the second arm 60 with the frame 18 of the scrubber 10. The pivot 46 defines an axis of rotation 97, as shown in FIG. 6. The pivot 46 includes a base plate 98 bolted to the second arm 60 as well as sealed spindle bearing 100.

Thus, in operation, when air is supplied to the frist cylinder 62, the rod 72 extends, pushing the front assembly 68 of the first arm 58 outward, toward the vehicle 12. The left and right lower supports 63, 64 roll over the lower rollers 82–88. If the cylinder 62 pushes the rod 72 out to a full entension, without encountering a force of approximately 0.4 pound per square inch on the bristles 51 (which is sufficient to keep the brush 44 from extendind further), air will then be supplied to the second cylinder 76 in the second arm 60.

The second cylinder 76 may then push out the front assembly 90 of the second arm 60, as well as the entire first arm 58 and brush 44. The second cylinder 76 will keep extending the rod 94 until the rod 94 is fully extended or the bristles 51 meet with a resistance of at least about 0.4 pound per square inch.

Figure 7:
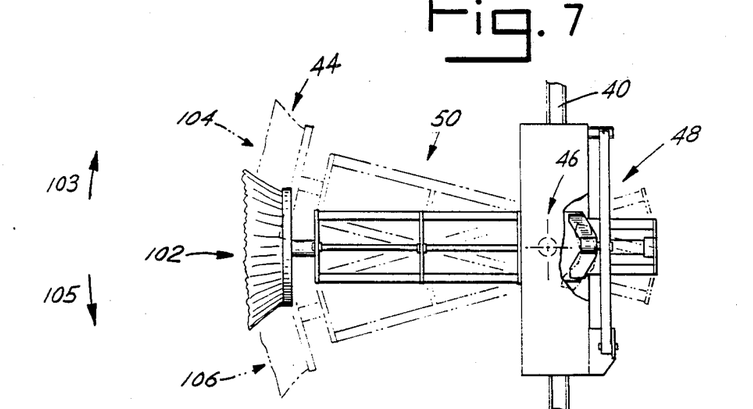
FIG. 7 is a top view of the brush, pivot, extension and centering assembly of the preferred embodiment shown in Figure.

The electric motor 56 is directly bolted to the firm arm 58. Thus, the brush 44, motor 56 and the first and second arms 58, 60 of the extension assembly 50 define a substantially single angular orientation 102 with respect to the frame 18 of the scrubber 10 as shown in FIG. 7. In the preferred embodiment as shown in FIG. 7, the extension assembly 50 normally forms an angle of approximately 90 degrees with respect to the side bracing member 40 of the frame 18. The pivot 46, however, allows the angular orientation of the brush 44 and extension assembly 50 to vary with respect to the side bracing member 40 of the frame 18.

Thus, for example, should the vehicle 12 drive into the brush 44, pushing the brush 44 in the direction of the arrow 103 shown in FIG. 7, the brush 44 could pivot to the second position 104 shown in FIG. 7. Alternatively, should the vehicle 12 back into the brush 44 in the direction shown by the arrow 105 in FIG. 7, the brush 44 could move to the third position 106 shown in FIG. 7. The brush 44 may thus pivot approximately 30 degrees on either side of its normal angular position 102 with respect to the frame. Such pivoting will help the brush 44 swing out of the way upon coming contact with the vehicle 12, thus avoiding damage to both the scrubber 10 and the vehicle 12.

The centering assembly 48, however, urges the brush 44 toward the predetermined angular position 102 (of approximately 90 degrees with respect to the side bracing member 40, 42 of the frame). Thus, even if knocked to one side by a vehicle, the brush 44 will tend to return to the normal position 102, in readiness for washing another vehicle.

In the present specification, it is to be understood that "centering" is used in a broad sense. In the present embodiment, the centering assembly 48 urges the brush 44 forward a single, central position. Other, alternative "centering" assemblies could, for example, return the brush to wash a particular area when the brush 44 has been pushed in oone direction but not when the brush is pushed in another position. Alternatively, the brush 44 could be constructed to move only in one direction from the predetermined portions.

Figure 4:
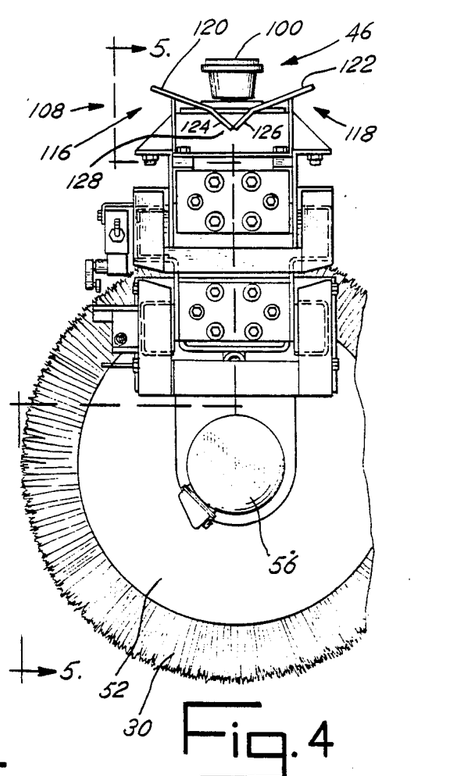
FIG. 4 is a rear view of the brush and pivot of the preferred embodiment shown in FIG. 1.
Figure 5:
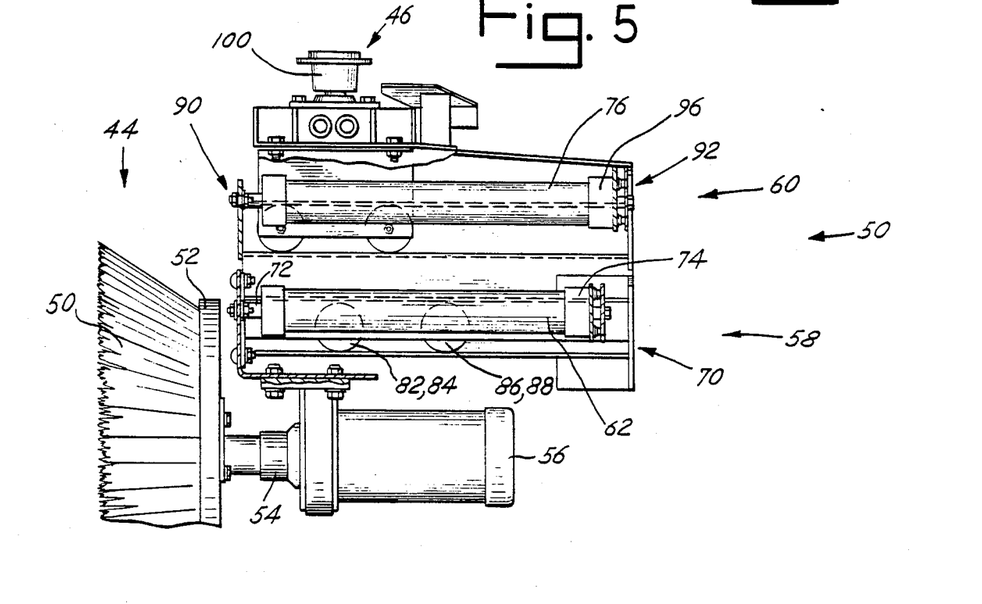
FIG. 5 is a side partial cross-sectional view of the brush and pivot of the preferred embodiment shown in FIG. 1.

As shown in FIGS. 2-5, the centering assembly 48 includes a positioning plate 108, roller wheel 110, tension arm 112, and tension spring 114. The positioning (or "V") plate 108 includes left and right tracks 116, 118. Each track includes a first downwardly sloping section 120, 122, and a second, more severely downwardly oriented section 124, 126. The two most downwardly oriented sections 124, 126 are joined together at a central point 128 such that the positioning plate forms a cross-sectional shape approximating the letter "V", as shown in FIG. 4.

The roller wheel 110 is made of hard plastic such as "Eralyte" and is approximately 2-⅞ inches in diameter and 1-⅝ inches wide. The roller wheel 110 is rotatably interconnected to the tension arm 112.

The plate 108 is approximately 3 inches wide. The first downwardly sloping sections 120, 122 are each approximately 4 inches long. The second, more severely downwardly sloping sections 124, 126 are each approximately 2 inches long. The first downwardly sloping sections 120, 122 of the plate 108 bear an angle to the horizontal of approximately 30 degrees. The second, more severely downwardly sloping sections 124,126 bear an angle with respect to horizontal of approximately 45 degrees.

The tension arm 112 includes first and second ends 129, 130. See FIG. 2. The first end 129 is hingedly attached to the frame 18. The second end 130 is attached to the tension spring 114. The spring 114 is interconnected between the second end 130 of the tension arm 112 and the flame 18. The tension arm 112 is approximately 20 inches long, and the roller wheel 110 is rotatably interconnected to the tension arm approximately 8-½ inches from the first end 129. The tension spring 114 is approximately 7 inches long in a relaxed position and may be stretched 2 to 4 inches, without permanent deformation, to cause a downward pressure on the end 130 of the tension arm 112 of approximately 50-100 pounds.

The apparatus 30 also includes a proximity switch 131, which senses the movement of scrubber 20 from its predetermined position 102. When moved from the position 102, the proximity switch makes contact, signalling for the air to retract the first and second arms 58, 60 back toward the frame 18. Therefore, in addition to rotating out of the way, the arms also retract to avoid damage. Thus, one alternative scrubber 20 might rely less upon the pivot 46, and rely exclusively on the proximity switch 131 to prevent damage when a vehicle comes in contact with the scrubber 20. Rather than pivoting out of the way, the switch 131 would allow the arms 58, 60, to simply retract out of the way.

The sensor assembly 24 includes a source of light 132 and a sensor 134. The source 132 and sensor 134 are attached to the frame 18. The light sensor 134 detects the light from the source 132. When the light from the source 132 is interrupted, such as, for example, by the passage of the vehicl wheels 14, 16 between the source and sensors 132, 134, the sensor 134 may then provide a signal to the wheel scrubber apparatus 20, 22. The wheel scrubber apparatus 20, 22 may then be activated to scrub the wheels 14, 16.

Thus, in operation, the vehicle 12 drives into the vehicle washing area of the scrubber 10. The passage of the wheels 14, 16 between the light sensor 134 and source of light 132 activates the wheel scrubbers 20, 22. Power is then supplied to the first pneumatic cylinder 62, which drives the first arm 58 outwardly, away from the frame 18, toward the vehicle washing area 46 and the vehicle wheel 14. After the first arm 58 extends approximately 13-½ inches, reaching full extension, air is then supplied to the second pneumatic cylinder 76. The second pneumatic cylinder 76 then pushes the front assembly 90 of the second arm 60 and as well as the first arm 58 (and the brush 44) further toward the vehicle 12. The brush 44 then encounters the hard surface of the wheel 14, movement of the brush 44 toward the vehicle 12 stops, and the brush 44, being rotated by the electric motor 56, cleans the wheel 14.

Should the wheel scrubber 20 be in an extended position and the vehicle 12 drive into the scrubber 20, the orientation of the brush 44 and the arms 58, 60 may more transversely to the direction that the arms 58, 60 normally travel toward the vehicle 12. See FIG. 7. After the force pushing the brush 44 and extension assembly 50 to one side stops, however, the tension spring 114 urges the roller 110 to roll down inclined surfaces 120-126 of the positioning plate 108, toward the predetermined central position 128, substantially adjacent the central point 128, where the left and right tracks 116, 118 meet. Urging the roller 110 down the plate 108, in turn urges the extension assembly 50 and brush 44 back to the normal, predetermined position 102.

The preferred embodiment of the present invention has been described herein. It is to be understood however, that changes and modifications can be made without departing from the true scope and spirit of the present invention.

Figure 9:
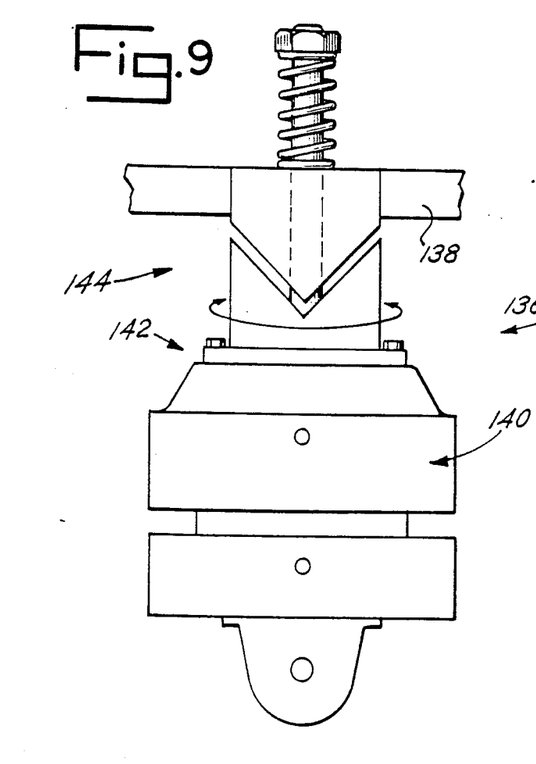
FIG. 9 is a side view of a pivot and centering assembly for an alternative embodiment of the invention shown in FIG. 1.
Figure 10:
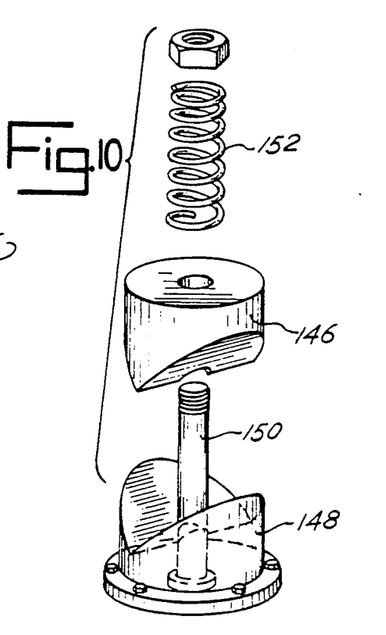
FIG. 10 is partial perspective view of the embodiment shown in FIG. 9.

Thus, examples of alternative embodiments are shown in FIGS. 9-13. FIG. 9 shows an alternative wheel scrubbing apparatus 136 having a frame 138, washing assembly 140, pivot 142, and centering assembly 144. An expanded view of the pivot 142 and centering assembly 144 is showm in FIG. 10. The pivot 142 comprises roller bearing, and the centering assembly 144 includes a stationary wedge 146, cup 148, central axis 150, and spring 152. The cup 148 and washing assembly 140 may rotate about the axis 150, but the spring 152, wedge 146, and cup 148 cooperatively define centering means to urge the washing assembly 140 back to a predetermined position.

Figure 11:
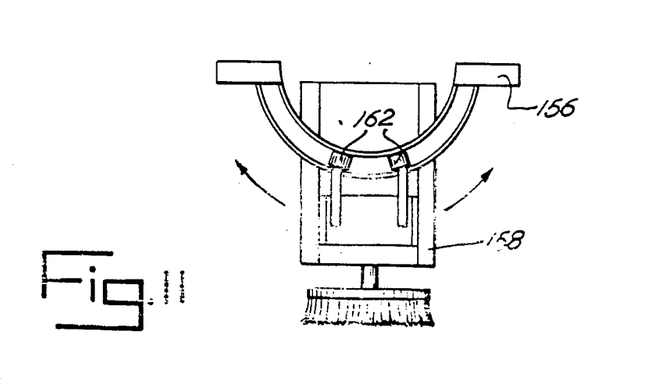
FIG. 11 is a top view of a pivot and centering assembly for another alternative embodiment of the invention shown in FIG. 1.
Figure 12:
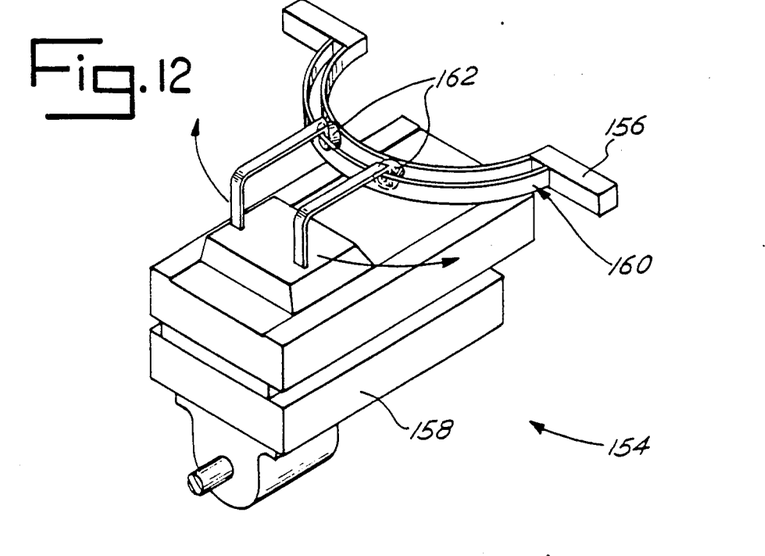
FIG. 12 is a perspective view of a pivot and centering assembly for the alternative embodiment of the invention shown in FIG. 11.

Still another alternative embodiment is shown in FIGS. 11 and 12. The alternative wheel scrubbing apparatus 154 includes a frame 156, washing assembly 158, inclined roller track 160, and roller wheels 162. The roller wheels 162 interconnect, the inclined roller track 160 and the washing assembly 158. The track 160, in turn, is fixedly attached to the frame 156. The roller wheels 162 are free to move on the track 160, thus allowing the orientations of the washing assembly 158 to change. Since the track 160 is inclined, however, gravity urges the washing assembly 158 to a single, lowest position.

Figure 13:
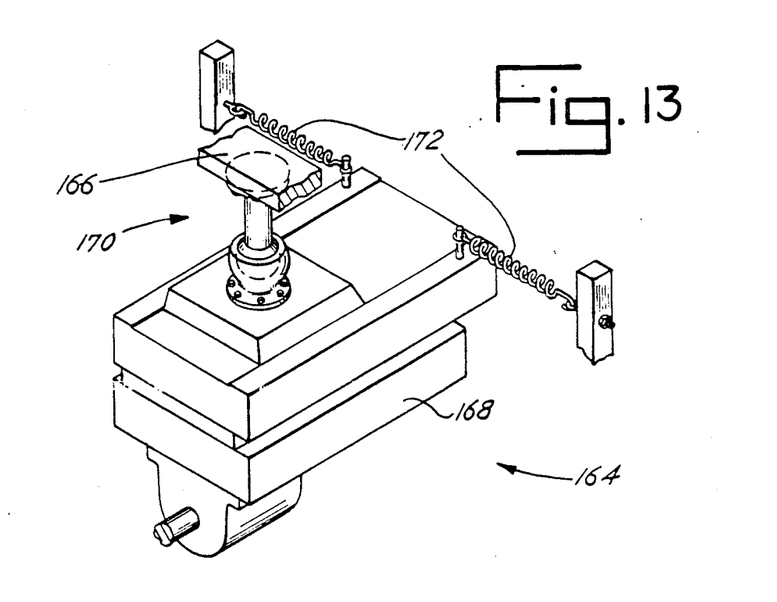
FIG. 13 is a perspective view of a pivot and centering assembly for yet another alternative embodiment of the invention shown in FIG. 1.

Yet another alternative wheel scrubbing apparatus 164 is shown in FIG. 13. The apparatus 164 includes a frame 166, washing assembly 168, ball joint 170, and mechanical springs 172. The ball joint 170 interconnects the washing assembly 168 to the frame 166, allowing the washing assembly 168 to rotate. The springs 172, however, urge the washing assembly 168 toward a single position.

In still further alternative embodiment, the scrubber 10 may, for example, use, instead of the source of light 132 and sensor 134, an ultrasonic sensor or a wand interconnected to a limit switch. Movement of the vehicle against the wand might then signal the wheel scrubbers apparatus 20, 22 to begin.

Also, the preferred embodiment uses first and second extension arms 58, 60. An alternative embodiment could, of course, use only one extension arm. Also, an alternative embodiment might use, for example, instead of an extension or tracks, a pivot and arm, which could allow a wheel brush to simply swing into position. Another pivot and arm could also swing the wheel brush in the direction substantially parallel to the direction of movement of the vehicle, should the vehicle collide with the brush. Furthermore, the alternative embodiments need not necessarily be powered by pneumatic cylinders. Electric motors or hydraulic systems could also, for example, be used, as could a system of pulleys and weights.

Also, of course, an alternative scrubber might utilize a slide interconnecting the scrubber with the frame, rather than pivot. Then, upon coming in contact with the vehicle, the scrubber could simply slide out of the way.

In addition, the preferred embodiment employs a scrubbing apparatus 20 hingedly attached to the frame 18. Other embodiments may use, for example, an extension arm that is hinged in the middle, so that a portion of the arm will "break away" when struck by a vehicle.

The true scope and spirit of the present invention are defined by the following claims and their equivalents, to be interpreted in light of the foregoing specification.

What is claimed is:

1. A scrubber for an automotive vehicle comprising, in combination:
    a frame;
    brush means for wiping said vehicle, said brush defining an angular orientation;
    extension means for pushing said brush means toward said vehicle, said extension means including a first extension arm, interconnected to said brush means, and a second extension arm, interconnected to said frame, said angular orientation of said brush being defined by said first arm with respect to said frame, said first and second arms being slidably interconnected, whereby said first arm may slide along said second arm toward said automotve vehicle;
    pivot means for allowing said brush means to change angular orientation; and
    centering means to urge said brush toward a predetermined angular orientation.

2. A scrubber as claimed in claim 1 further comprising spindle bearing means interconnecting said second extension arm to said frame for allowing said second extension arm to pivot about said spindle bearing means, whereby said brush means may be moved substantially transversely to said predetermined angular orientation without causing substantial damage to said scrubber.

3. A scrubber as claimed in claim 2 wherein said centering means comprises a roller on a track, said roller interconnected to said second arm and said track being interconnected to said frame, said track including first and second downwardly inclined segments, said segments, defining upper and lower sections, and said lower sections of said first and second downwardly inclined segments meeting to cooperatively define a lower joint.

4. A scrubber as claimed in claim 3, wherein said track includes a central position and said scrubber further comprises a spring, interconnected to said roller, to further urge said roller toward said central position and thus urge said brush means toward said predetermined angular position.

5. A scrubber as claimed in claim 4 further comprising a pneumatic cylinder for moving said first extension arm toward a wheel of said vehicle.

6. A scrubber as claimed in claim 5 further comprising a pneumatic cylinder for sliding a first extension arm along said second arm toward said wheel of said vehicle.

7. A scrubber for an automotive vehicle, said vehicle having rotatable wheels and oriented for rectilinear motion comprising, in combination:
    rotating brush means for wiping said vehicle;
    a rotating member for rotating said rotating brush means;
    biasing means for orienting the axis of rotation of said rotating member substantially parallel to the axis of rotation of the wheels of said vehicle; and
    a single pivoting member for allowing angular displacement of said rotating member about a vertical axis, wherein said rotating member may be displaced to subtend an angle with respect to either side of said biased orientation of said rotating member.

8. A scrubber for an automotive vehicle, said vehicle having rotatable wheels and oriented for rectilinear motion, comprising, in combination:
    rotating brush means for wiping said vehicle;
    a rotating member for rotating said rotating brush means;
    support means for supporting said rotating member;
    biasing means for orienting the axis of rotation of said rotating member and said support means substantially parallel to the axis of rotation of the wheels of said vehicle;
    a single pivoting member connected to said support means for allowing angular displacement of said support means and said rotating member about a vertical axis, wherein said support means and rotating member may be displaced to subtend an angle with respect to either side of said biased orientation of said support means and rotating member; and a frame for supporting said pivoting member.

9. A scrubber as claimed in claim 8 wherein said pivoting member further comprises spindle bearing means for interconnecting said pivoting member to said frame.

10. A scrubber as claimed in claim 8 wherein said biasing means comprises:

two inclined members, said inclined members substantially forming a V-shaped track transversely mounted on said support means;

roller means interconnected to said frame, said roller means being biasedly positioned to a rest position in a low portion of said V-shaped track when said rotating member and support means are in said biased orientation, whereby angular displacement of said rotating member and support means from said biased orientation causes displacement of said roller means along one of said inclined members, and said roller means returns said rotating member and support means to said biased orientation upon returning to said rest position.

11. A scrubber as claimed in claim 10 wherein said biasing means further comprises a spring interconnected to said roller, said spring urging said roller to said rest position in said track by positioning said rotating member and support means in said biased orientation in response to said angular displacement.

12. A scrubber as claimed in claim 8 wherein said support means includes extension means for pushing said brush means toward said vehicle.

13. A scrubber as claimed in claim 8 wherein said rotating member comprises an electric motor for rotating said brush means.

14. A scrubber for cleaning rotatable wheels on opposing sides of an automobile, said automobile oriented for rectilinear motion, comprising, in combination:

first and second rotating brush means for scrubbing said wheels on said vehicle;

first and second rotating members for rotating said first and second rotating brush means, respectively;

first and second biasing means for orienting the axis of rotation of said first and second rotating members substantially parallel to the axis of rotation of said wheels; and first and second pivoting members for allowing angular displacement of said first and second rotating members about a first and second vertical axis, wherein said first and second rotating members may be displaced to subtend an angle with respect to either side of said biased orientation of said of said first and second rotating members, respectively.

* * * * *